United States Patent
Tao

(10) Patent No.: US 8,570,996 B2
(45) Date of Patent: Oct. 29, 2013

(54) METHOD OF RELAYING AN ELECTRONIC MESSAGE TO A HANDHELD ELECTRONIC DEVICE BEYOND THE COVERAGE AREA OF A WIRELESS NETWORK

(75) Inventor: Jimmy Tao, Burnaby (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/571,701

(22) Filed: Aug. 10, 2012

(65) Prior Publication Data
US 2012/0300764 A1 Nov. 29, 2012

Related U.S. Application Data

(63) Continuation of application No. 11/469,626, filed on Sep. 1, 2006, now abandoned.

(51) Int. Cl.
| | | |
|---|---|---|
| H04W 4/00 | (2009.01) |
| H04B 7/14 | (2006.01) |
| H04B 7/15 | (2006.01) |
| H04B 3/36 | (2006.01) |
| H04B 7/00 | (2006.01) |
| H04J 1/10 | (2006.01) |
| H04J 3/08 | (2006.01) |
| H04M 1/00 | (2006.01) |

(52) U.S. Cl.
USPC ............ 370/338; 455/7; 455/11.1; 455/41.2; 455/517; 455/552.1; 370/315; 370/492; 370/501

(58) Field of Classification Search
USPC ............... 455/412.1, 456.3, 466, 7, 458, 515, 455/550.1, 552.1, 11.1, 41.2, 517; 370/338, 370/492, 501, 315
See application file for complete search history.

(56) References Cited

U.S. PATENT DOCUMENTS

| | | | |
|---|---|---|---|
| 6,574,266 B1 * | 6/2003 | Haartsen .................. 375/133 |
| 6,754,484 B1 | 6/2004 | Hiltunen et al. |
| 7,110,715 B2 | 9/2006 | Gupta |
| 2002/0142717 A1 * | 10/2002 | Morimoto .................. 455/11.1 |
| 2003/0162554 A1 | 8/2003 | Kim |
| 2004/0023650 A1 * | 2/2004 | Ohta et al. .................. 455/422.1 |
| 2004/0071107 A1 | 4/2004 | Kats et al. |
| 2004/0203615 A1 * | 10/2004 | Qu et al. .................... 455/412.1 |
| 2004/0203617 A1 * | 10/2004 | Knauerhase et al. ...... 455/412.1 |
| 2005/0203673 A1 | 9/2005 | El-Haji et al. |
| 2005/0227672 A1 | 10/2005 | Lauzon et al. |
| 2006/0120338 A1 * | 6/2006 | Hwang et al. ................. 370/338 |
| 2006/0293068 A1 | 12/2006 | Svensson et al. |
| 2007/0004333 A1 * | 1/2007 | Kavanti ...................... 455/3.06 |

FOREIGN PATENT DOCUMENTS

| | | |
|---|---|---|
| EP | 1 207 707 A | 5/2002 |
| EP | 1 241 090 A1 | 9/2002 |
| EP | 1 259 036 A1 | 11/2002 |
| WO | 98/39936 A2 | 9/1998 |

* cited by examiner

*Primary Examiner* — Anthony Addy
*Assistant Examiner* — Michael Mapa
(74) *Attorney, Agent, or Firm* — Ridout & Maybee LLP

(57) ABSTRACT

A method of transmitting an electronic message to a handheld electronic device that is outside the coverage area of a wireless network having at least one Access Point. The method includes: attempting to wirelessly transmit the electronic message from the network to the handheld electronic device through the wireless access point; wirelessly transmitting the electronic message from the wireless access point to a peer handheld electronic device that is within communication range of the access point; and wirelessly transmitting the electronic message from the peer handheld electronic device to the handheld electronic device when the peer handheld electronic device is within communication range of the handheld electronic device.

13 Claims, 8 Drawing Sheets

METHOD OF RELAYING AN ELECTRONIC MESSAGE TO A HANDHELD ELECTRONIC DEVICE BEYOND THE COVERAGE AREA OF A WIRELESS NETWORK

RELATED APPLICATION DATA

The present application is a continuation of U.S. patent application Ser. No. 11/469,626, filed Sep. 1, 2006, the content of which is incorporated herein by reference.

TECHNICAL FIELD

The present disclosure relates generally to handheld electronic devices and, more particularly, to a method of transmitting a message to a handheld electronic device that is beyond the coverage area of a wireless network.

BACKGROUND

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices. Examples of such handheld electronic devices are provided in U.S. Pat. Nos. 6,452,588 and 6,489,950.

Referring to FIG. 1A, a wireless network 1 that includes a handheld electronic device 2 that is able to wirelessly communicate with a network 4, such as a data network, when the handheld electronic device 2 is within the coverage area (communication range) 6 of a wireless Access Point 8 that is in electronic communication with the network 4. While the handheld electronic device 2 is within the coverage area 6 of the Access Point 8, the handheld electronic device 2 is able to receive an electronic message (e.g. e-mail message) 10 that was sent from a sending source such 12 as, without limitation, a remote device. As can be seen from this figure, the electronic message 10 is transmitted from the remote device 12 to the network 4 which then transmits the electronic message 10 to the Access Point 8. From the Access Point 8 the electronic message 10 is transmitted to the handheld electronic device 2. The shortcoming to this wireless network 1 is that the handheld electronic device 2 is unable to receive the electronic message 10 when the handheld electronic device 2 is not within (i.e. beyond or outside of) the coverage area 6 of the Access Point 8 (see FIG. 1B). For instance, the handheld electronic device 2 might be located in a rural area. In order to overcome this shortcoming, additional Access Points 8 may be deployed in order to increase the total coverage area of the network 4. The costs associated with deploying additional Access Points 8, however, can be time consuming and monetarily prohibitive.

BRIEF DESCRIPTION OF THE DRAWINGS

A full understanding of the disclosed and claimed concept can be gained from the following Description when read in conjunction with the accompanying drawings in which:

DESCRIPTION

Figure 1A:
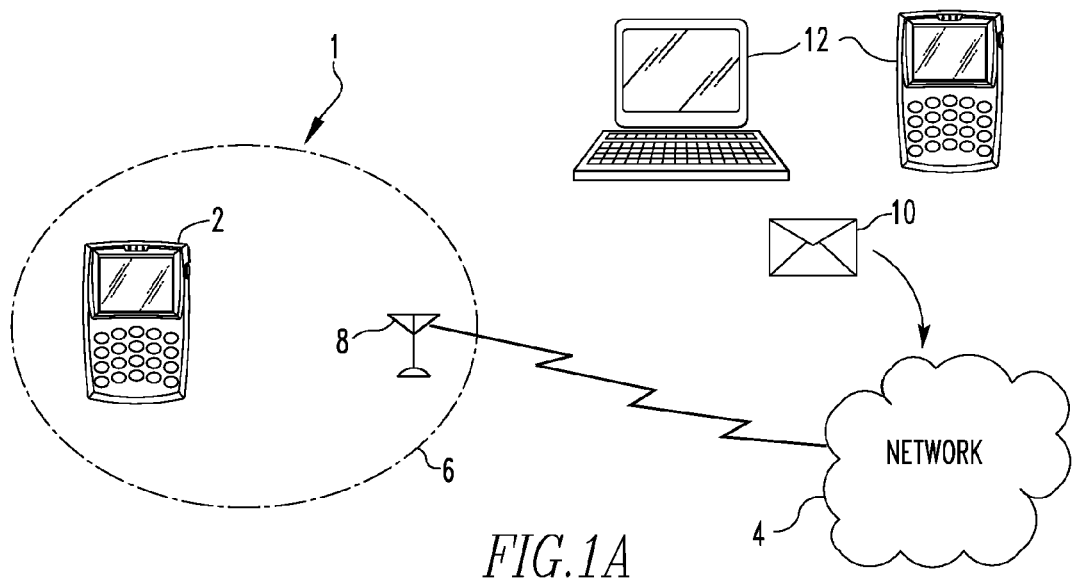
FIGS. 1A and 1B are schematic diagrams of a wireless network having an Access Point, which is in electronic communication with a network, and a handheld electronic device that is either within the coverage area of the Access Point (FIG. 1A) or outside/beyond the coverage area of the Access Point (FIG. 1B)

As employed herein, the phrase "a number" and variations thereof means one or an integer greater than one (i.e., a plurality).

As employed herein, the term "Wi-Fi" means by way of example, and not limitation, a wireless fidelity standard such as IEEE 802.11b, 802.11g, or 802.11a.

As employed herein, the term "Access Point" or "Base Station" means a device that receives data from a network and wirelessly transmits the data for subsequent receipt by one or more devices.

When referring to any numerical range of values, such ranges are understood to include each and every number and/or fraction between the stated range minimum and maximum.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

In accordance with one embodiment of the present disclosure, there is provided a method for sending a message from a WLAN access point to a first wireless communication device, and wherein the first wireless communication device is not within communication range of the WLAN access point and is operable to communicate over a WLAN and over a second wireless network, and wherein a second wireless communication device is operable to communicate over the WLAN and over the second wireless network is within communication range of the WLAN access point, the method comprising: registering the first wireless communication device and the second wireless communication device with the WLAN access point, wherein by registering with the WLAN access point the first wireless communication device and the second wireless communication device are each assigned an unique identifier, and wherein the message includes the unique identifier that corresponds to the first wireless communication device; attempting to send the message from the WLAN access point to the first wireless communication device; sending the message from the WLAN access point to the second wireless communication device; in response to the second wireless device being within communication range, over the second wireless network, of the first wireless device, and the first wireless device having the unique identifier included in the message, sending only the message having the unique identifier from the second wireless communication device over the second wireless network to the first wireless communication device, and after receipt of the message by the first wireless communication device, sending a signal from the first wireless communication device over the second wireless network to all peer wireless communication devices within communication range of the first communication device within the second wireless network, the signal instructing the peer wireless communication devices to delete the message from memories on the peer wireless communication devices.

Figure 1B:
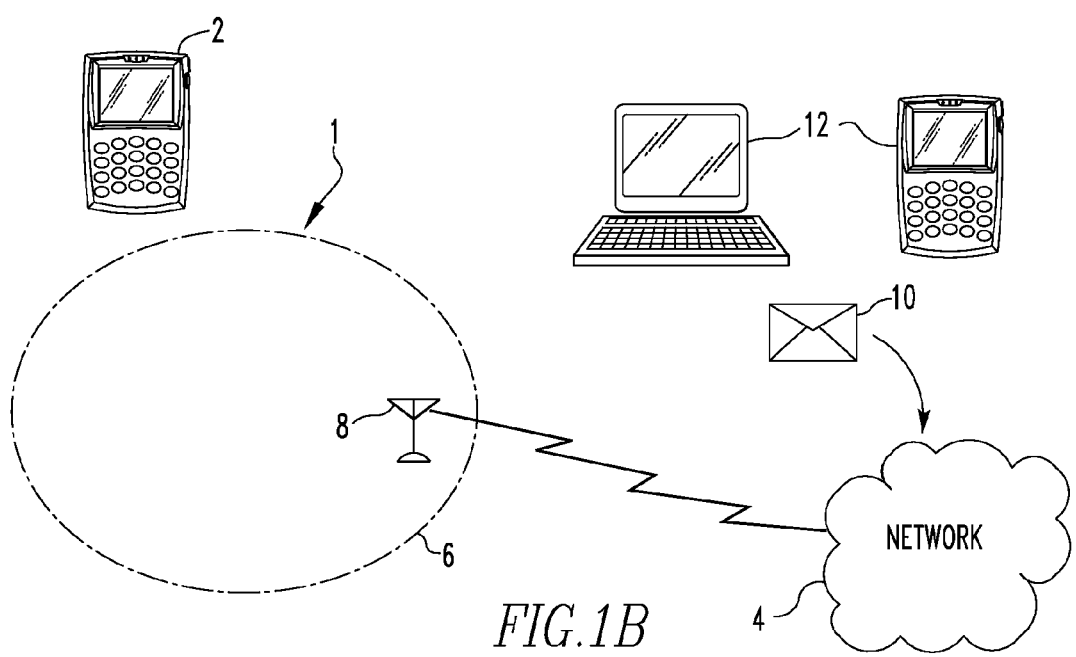

The improved wireless network 14 is similar to the wireless network 1 shown in FIGS. 1A and 1B in that it includes a network 4 that is in electronic communication with at least one Access Point 8. If a handheld electronic device 2 is not within the coverage area of an Access Point 8, the handheld electronic device 2 is unable to directly receive electronic messages 10 from the network 4. The disclosed concept provides for an improved wireless network 14 that allows a handheld electronic device 2 to receive electronic messages 10 despite being outside of the coverage area of an Access Point that is connected to the network 4 by utilizing peer handheld electronic devices as rallying points for transmitting the electronic messages 10 to the handheld electronic device 2.

Figure 2A:
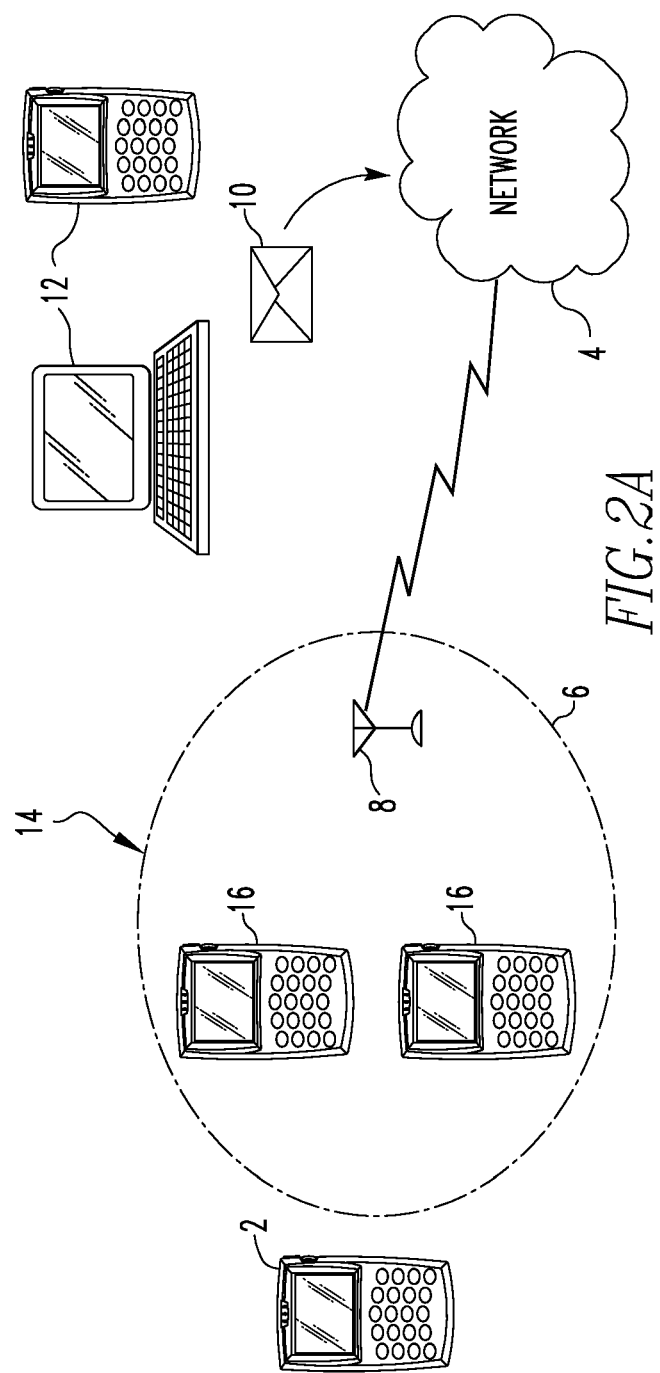
FIGS. 2A, 2B, 2C, 2D, and 2E are schematic diagrams of a wireless network in accordance with various embodiments of the disclosed and claimed concept.

As can be seen from FIG. 2A, an Access Point 8 is in electronic communication with a network 4, such as a data and/or a voice network. Similar to FIG. 1A, the network 4 can receive a number of electronic messages 10, which are intended for the handheld electronic device 2, from a number of sending sources 12. It should be noted, however, that while FIG. 2A depicts the sending sources 12 as being located remotely from the network 4, other sending sources 12, such as various computing devices, local to the network 4 also fall within the scope of the disclosed and claimed concept. As can be seen from this figure, the electronic message 10 is transmitted from the sending source 12 to the network 4 which transmits the electronic message 10 to the Access Point 8. Typically, the electronic message 10 is then transmitted from the Access Point 8 to the handheld electronic device 2. As can be seen from FIG. 2A, however, the handheld electronic device 2 is not within the Access Point's 8 coverage area 6. Accordingly, the Access Point 8 would not be able to directly transmit the electronic message 10 to the handheld electronic device 2.

In order to allow the handheld electronic device 2 to receive the electronic message 10 that was transmitted to the network 4, a number of peer handheld electronic devices 16 are employed as rallying points for transmitting the electronic message 10 to the handheld electronic device 2. Referring to FIG. 2A, when the network 4 determines that the electronic message 10 cannot be transmitted directly to the handheld electronic device 2 because the handheld electronic device 2 is not within the coverage area 6 of Access Point 8, the network 4 transmits a copy of the electronic message 10 to one or more peer handheld electronic devices (first peer handheld electronic devices) 16 that are within the coverage area 6 of the Access Point 8. Once the electronic message 10 has been transmitted to the first peer handheld electronic devices 16, the electronic message 10 is stored in the memory thereof. In order to protect the privacy of the user of the handheld electronic device 2, the electronic message 10 can be encrypted (according to any one of a number of known encryption schemes in which the handheld electronic device 2 would have a key for decrypting the message; such schemes may include, without limitation, symmetric (secret key) and/or asymmetric (public key) systems) to prevent unauthorized viewing of the electronic message 10 by the users of the first peer handheld electronic devices 16.

Figure 2B:
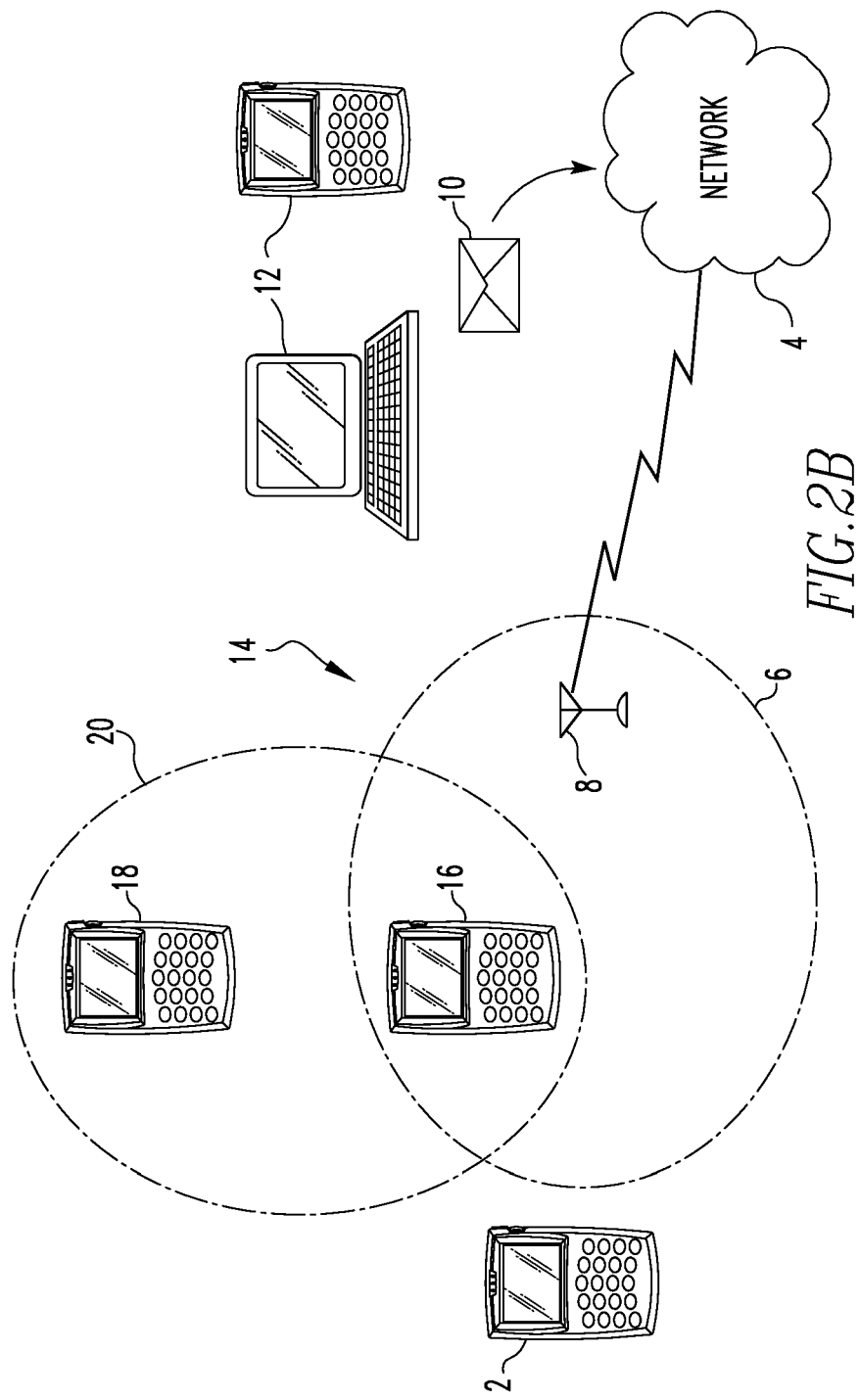
Figure 2C:
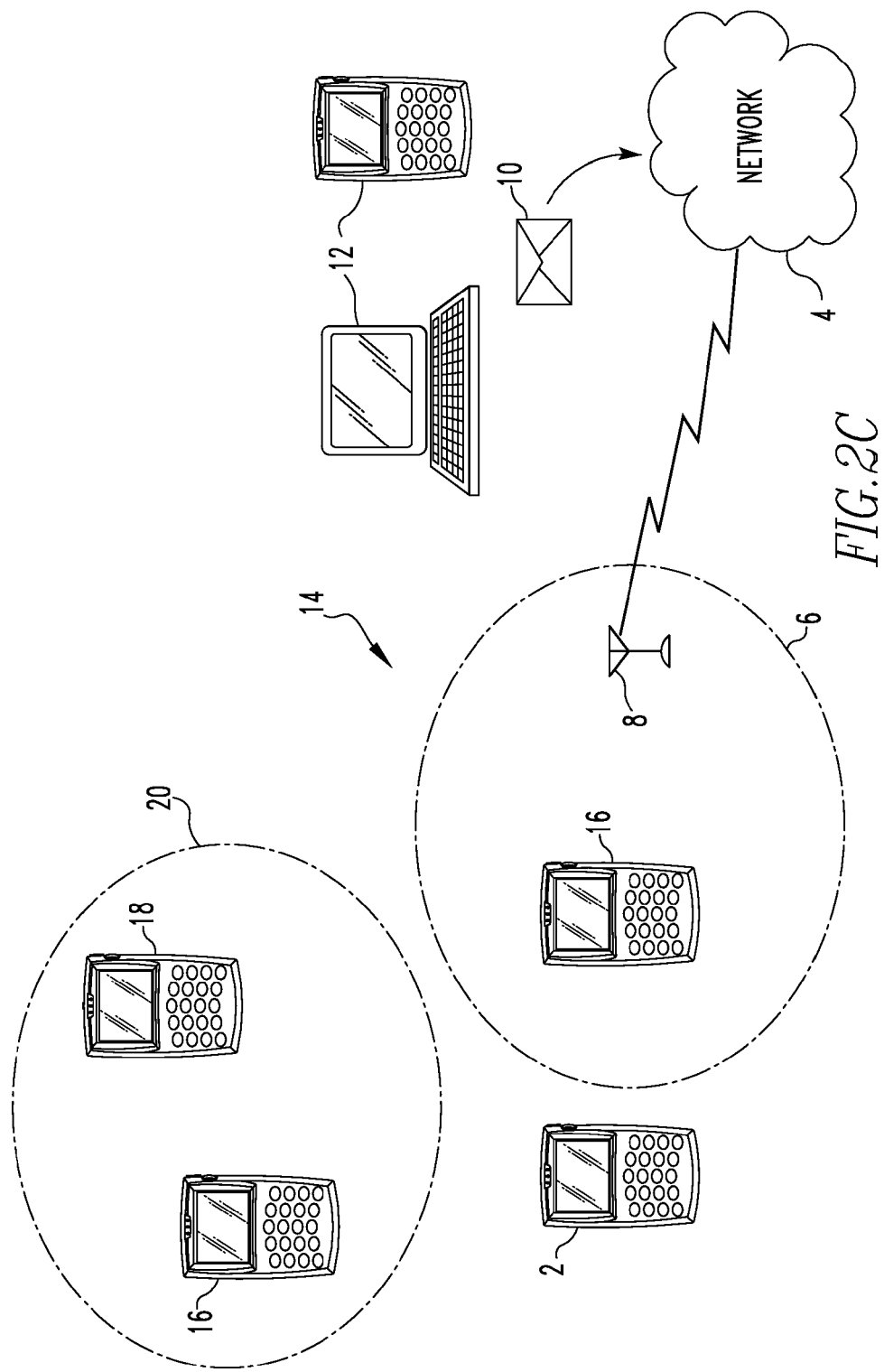

Referring to FIG. 2B, after the electronic message 10 has been transmitted and stored on the first peer handheld electronic device 16, the first peer handheld electronic device 16 can also transmit a copy of the electronic message 10 to one or more additional peer handheld electronic devices (second peer handheld electronic devices) 18 when the first peer handheld electronic device 16 is within communication range 20 of the second peer handheld electronic devices 18 thereby increasing the total number of rallying points used to forward the electronic message 10 to the electronic handheld device 2. The system utilized to transfer the electronic message 10 between first and second peer handheld electronic devices 16,18 (hereinafter, referred collectively as peer handheld electronic devices) can include, but shall not be limited to, Bluetooth, Infrared, and/or Wi-Fi. As can be seen from FIGS. 2B and 2C, a first peer handheld electronic device 16 can transmit the electronic message 10 to a second peer handheld electronic device 18 regardless of whether the first peer handheld electronic device 16, after receiving the electronic message 10 from the Access Point 8, is within or outside of the Access Point's 8 coverage area 6. After the second peer handheld electronic device 18 receives the transmitted electronic message 10, the electronic message 10 is stored in the memory of the second peer handheld electronic device 18 and can be encrypted for security/privacy purposes.

Figure 2D:
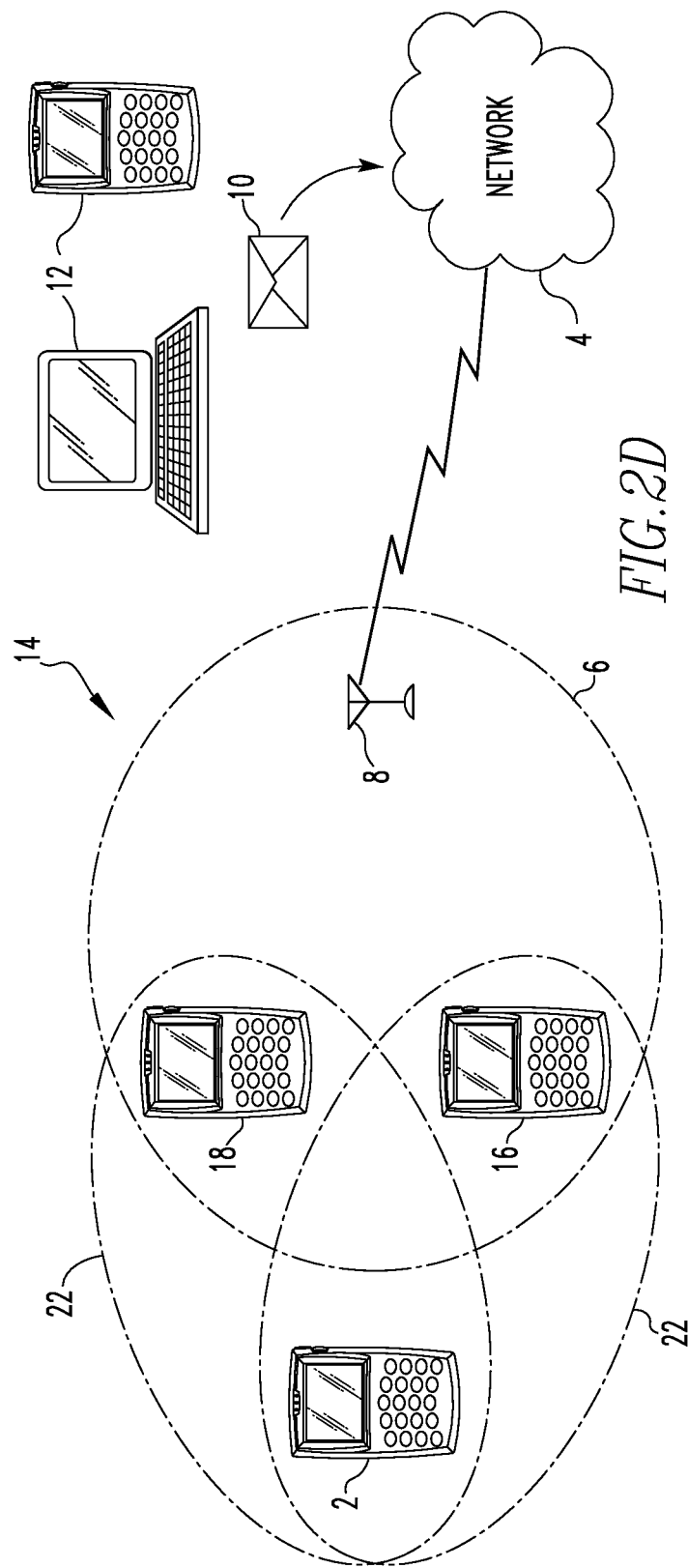
Figure 2E:
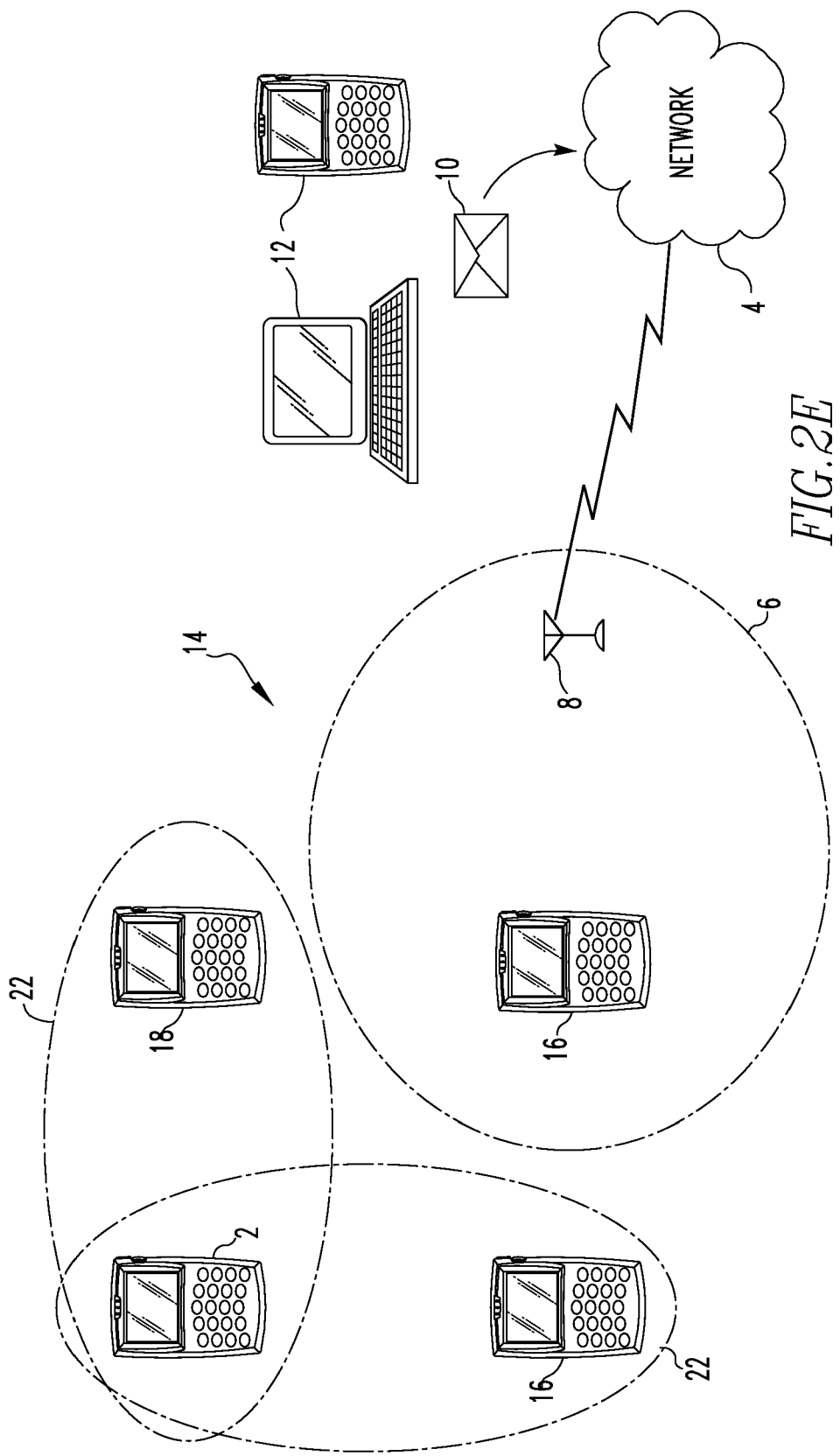

Referring to FIGS. 2D and 2E, when the first or second peer handheld electronic device 16,18 is within communication range 22 of the handheld electronic device 2, the first or second peer handheld electronic device 16,18 will attempt to transmit the electronic message 10 to the handheld electronic device 2. It should be noted that the first or second peer handheld electronic device 16,18, while attempting to transmit the electronic message 10 to the handheld electronic device 2, can either be within or beyond the coverage area 6 range of the Access Point 8. Similar to the transmission of the electronic message 10 between the peer handheld electronic devices 16,18, the system used to transmit the electronic message 10 from the first or second peer handheld electronic device 16,18 to the handheld electronic device 2 can include, but shall not be limited to, Bluetooth, Infrared, and/or Wi-Fi. Once the entire electronic message 10 has been received and stored in the handheld electronic device's 2 memory, the handheld electronic device 2 will transmit a confirmation signal to the first or second peer handheld electronic device 16,18 verifying that the entire electronic message 10 has been received. If the electronic message 10 was not successfully transmitted to the handheld electronic device 2 or not successfully transmitted in its entirety, the handheld electronic device 2 will transmit a signal to the first or second peer handheld electronic device 16,18 requesting that the first or second peer handheld electronic device 16,18 re-transmit the electronic message 10. After the handheld electronic device 2 has successfully received the electronic message 10, the handheld electronic device 2, assuming that the electronic message 10 has been encrypted, will decrypt the electronic message 10 so that the user of the handheld electronic device 2 may view the electronic message 10. Otherwise, the user will be able to view the electronic message 10 once the electronic message 10 has been stored in the handheld electronic device's 2 memory. In the event that the electronic message 10 is transmitted to the incorrect handheld electronic device 2 decryption of the electronic message 10 will fail thereby preventing unauthorized viewing of the electronic message 10.

After the electronic message 10 has been received by the handheld electronic device 2, the handheld electronic device 2 can prevent other peer handheld electronic devices 16,18 from transmitting the electronic message 10 to the handheld electronic device 2. This may be accomplished by transmitting a signal to these peer handheld electronic devices 16,18, when the peer handheld electronic devices 16,18 are within communication range 22 of the handheld electronic device 2, which indicates to peer handheld electronic devices 16,18 that there is no need to transmit the electronic message 10 to the handheld electronic device 2 since the electronic message 10 has already been received. Additionally, the handheld electronic device 2, upon re-entering the coverage area 6 of the Access Point 8, can also transmit a signal to the Access Point 8 that informs the network 4 that the electronic message 10 was received and that the network 4 should stop all future attempts to forward the electronic message 10 to the handheld electronic device 2 or to first peer handheld electronic devices 16 (for indirectly delivering to the handheld electronic device 2). For this purpose, in order to be able to uniquely identify and track each electronic message 10, the network 4 may assign a unique identifier to each message 10 (such as a serial number) before the message 10 is transmitted to a first peer handheld electronic device 16 for subsequent delivery as disclosed herein.

When the first or second peer handheld electronic device 16,18 that successfully transmitted the electronic message 10 to the handheld electronic device 2 is within communication range of the Access Point 8, the first or second peer handheld electronic device 16,18 will transmit a signal to the Access Point 8 that informs the network 4 that the electronic message 10 has been delivered to the handheld electronic device 2. Upon receipt of this signal, the network 4 will cease all future attempts to transmit the electronic message 10 to the handheld electronic device 2 or to the first peer handheld electronic devices 16. For instance, upon receipt of this signal the network 4 can update a message list showing that the electronic message 10 has been received by the handheld electronic device 2. In response to the updated list, the network 4 will then cease all future attempts to transmit the electronic message 10 to the first peer handheld electronic devices 16. Additionally, the network 4 can also transmit a signal to all peer handheld electronic devices 16,18 that are within communication range 6 of the Access Point 8 to stop all attempts to transmit the electronic message 10 to the handheld electronic device 2. In response, those peer handheld electronic devices 16,18 can delete the electronic message 10 from their memory. Furthermore, the updated message list can also instruct the network 4 not to attempt to transmit the electronic message 10 to the handheld electronic device 2 when the handheld electronic device 2 re-enters communication range of the Access Point 8.

In accordance with one embodiment of the disclosed and claimed concept, the first or second peer handheld electronic device 16,18 that successfully delivers the electronic message 10 to the handheld electronic device 2 will delete the electronic message 10 from the memory thereof upon receiving a confirmation signal from the handheld electronic device 2 that the electronic message 10 was received.

In accordance with another embodiment of the disclosed and claimed concept, the handheld electronic device 2, after receiving the electronic message 10, will transmit a signal to all peer handheld electronic devices 16,18 that are within communication range 22 of the handheld electronic device 2 to delete the electronic message 10 from their memory.

In accordance with another embodiment of the disclosed and claimed concept, the peer handheld electronic devices 16,18 will delete the electronic message 10 from memory after a predetermined time interval (during which they have not been able to successfully transmit the electronic message 10 to the handheld electronic device 2).

In accordance with another embodiment of the disclosed concept, each handheld electronic device 2 and peer handheld electronic device 16,18 must be pre-registered with the wireless network 14 as a member of that network 4. When so registered, each handheld electronic device 2 and peer handheld electronic device 16,18 will be assigned a unique identifier, such as a PIN or identification number. In this embodiment, the peer handheld electronic devices 16,18 can receive and attempt to deliver electronic messages 10 that are intended for a number of different handheld electronic devices 2. Accordingly, in this embodiment each electronic message 10 will have associated therewith (e.g. as part of or appended to the message) the identifier, such as a PIN or identification number, that corresponds to the particular handheld electronic device 2 for which the message 10 is intended. When a first or second peer handheld electronic device 16,18 is within communication range 22 of a handheld electronic device 2, electronic messages 10 that have an identifier that is associated with that particular handheld electronic device 2 are transmitted to the handheld electronic device 2 while electronic messages 10 that do not have a corresponding identifier are not transmitted. In this embodiment, when a first peer handheld electronic device 16 is within the coverage area 6 of the Access Point 8, it will receive a predetermined number of such electronic messages 10 intended for a number of the handheld electronic devices 2 for subsequently delivery as described above.

In accordance with another embodiment of the disclosed concept, the handheld electronic device 2 will only receive electronic messages 10 from peer handheld electronic devices 16,18 when the handheld electronic device 2 is transmitting a signal that informs the peer handheld electronic devices 16,18 that the handheld electronic device 2 is configured to receive electronic messages 10. For instance, the first or second peer handheld electronic device 16,18 would not transmit the electronic message 10 to the handheld electronic device 2 until the first or second peer handheld electronic device 16,18 receives a signal that instructs the first or second peer handheld electronic device 16,18 to initiate the transmission of the electronic message 10.

In accordance with another embodiment of the disclosed and claimed concept, the network 4 could limit the total number of peer handheld electronic devices 16,18 that the electronic message 10 is transmitted to. For instance, the network 4 can transmit a signal, via the Access Point 8, to the first peer handheld electronic devices 16 instructing the first peer handheld electronic devices 16 not to transmit the electronic message to any second peer handheld electronic devices 18. In another instance, the network 4 could transmit a signal to the first peer handheld electronic devices 16 instructing the first peer handheld electronic devices to transmit the electronic message 10 to a certain number of second peer handheld electronic devices 18.

Figure 3:
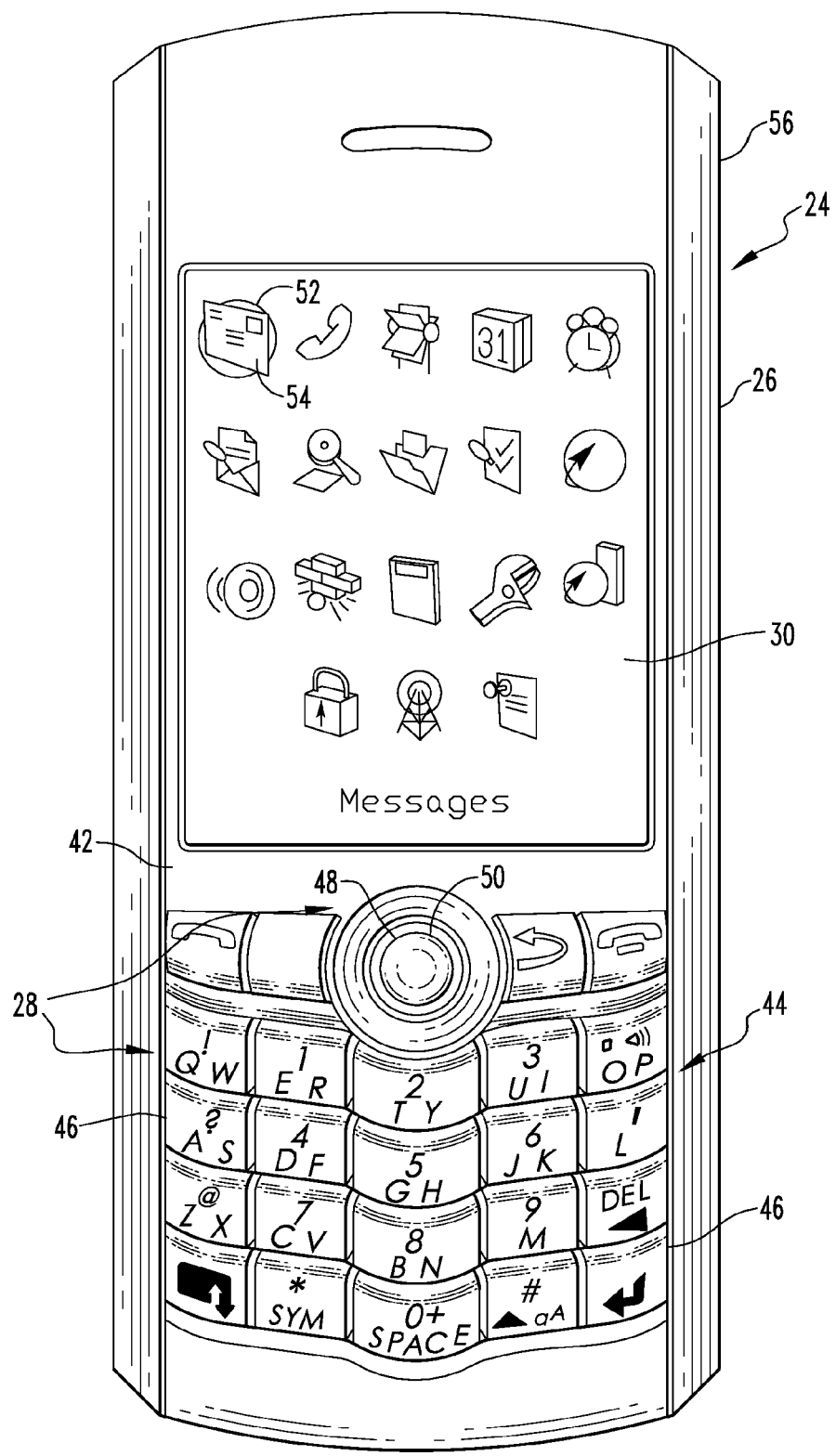
FIG. 3 is top plan view of an embodiment of the handheld electronic device.
Figure 4:
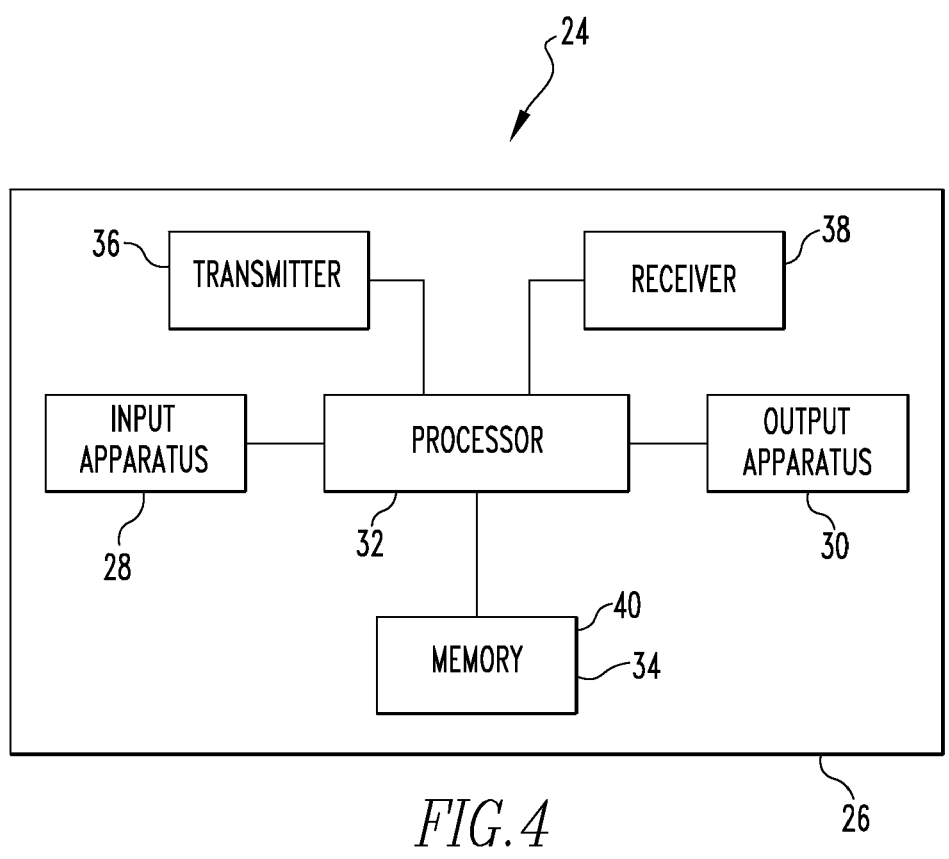
FIG. 4 is a schematic of the handheld electronic device of FIG. 3.

The handheld electronic device 2 and the peer handheld electronic devices 16, 18 that are described above are represented in the form of an exemplary handheld electronic device 24 in FIG. 3 and depicted schematically in FIG. 4. The handheld electronic device 24 includes a housing 26 upon which are disposed a processor unit that includes an input apparatus 28, an output apparatus 30, a processor 32, a memory 34, a transmitter 36, and a receiver 38. The processor 32 may be, for instance, and without limitation, a microprocessor (pP) and is responsive to inputs from the input apparatus 28 and provides output signals to the output apparatus 30. The processor 32 also interfaces with the memory 34 which contains one or more routines 40 that are adapted to initiate the transmission or reception of the electronic messages 10 via the transmitter 36 or receiver 38, respectively.

Referring to FIG. 3, the front face 42 of the housing 26 includes a keypad 44 that is in the exemplary form of a reduced QWERTY keyboard having a plurality of keys 46 that serve as input members. It is noted, however, that the keypad 44 may be of other configurations, such as an AZERTY keyboard, a QWERTZ keyboard, or other keyboard arrangement, whether presently known or unknown, and either reduced or not reduced. Continuing with FIG. 3, the front face 42 of the housing 26 also includes a navigational tool 48. In this particular embodiment, the navigational tool 48 is a trackball 50 that can be rotated thereby allowing for the navigation of a cursor 52, which is displayed on the output apparatus 30, in various directions including up, down, left, right, and any combination thereof. Moreover, the trackball 50 can also be depressed. When the trackball 50 is depressed, a selection is made based upon the current location of the cursor 52. For example, if the cursor 52 is located over a given program icon 54, that program will be launched when the trackball 50 is depressed. It should be noted, however, that despite FIG. 3 depicting the navigational tool 48 as being disposed on the front face 42 of the housing 26, the navigational tool 48 can also be disposed on a side 56 of the housing 26. For example, a trackwheel (not shown), which is capable of being rotated and depressed, may be disposed on the side 56 of the housing 26 in lieu of the trackball 50. Rotation of the trackwheel can provide a navigation input, while depression of the trackwheel can provide a selection input. Accordingly, rotation of the trackwheel can navigate the cursor 52 over a particular program icon 54, while depression of the trackwheel can launch the program.

The accompanying figures and the description that follows set forth this disclosed and claimed concept in its preferred embodiments. It is, however, contemplated that persons generally familiar with wireless networks will be able to apply the novel characteristics of the structures and methods illustrated and described herein in other contexts by modification of certain details. Accordingly, the figures and description are not to be taken as restrictive on the scope of the disclosed and claimed, but are to be understood as broad and general teachings.

The invention claimed is:

1. A method for sending a message from a Wireless Local Area Network (WLAN) access point to a first wireless communication device, and wherein the first wireless communication device is not within communication range of the WLAN access point and is configured to communicate over a WLAN and over a second wireless network, and wherein a second wireless communication device is configured to communicate over the WLAN and over the second wireless network and is within communication range of the WLAN access point, the method comprising:

registering the first wireless communication device and the second wireless communication device with the WLAN access point, wherein by registering with the WLAN access point the first wireless communication device and the second wireless communication device are each assigned a unique identifier, and wherein the message includes the unique identifier that corresponds to the first wireless communication device;

attempting to send the message from the WLAN access point to the first wireless communication device;

sending the message from the WLAN access point to the second wireless communication device;

in response to the second wireless device being within communication range, over the second wireless network, of the first wireless device and the first wireless device having the unique identifier included in the message, sending only the message having the unique identifier from the second wireless communication device over the second wireless network to the first wireless communication device; and after receipt of the message by the first wireless communication device, sending a signal from the first wireless communication device over the second wireless network to all peer wireless communication devices within communication range of the first communication device within the second wireless network, the signal instructing the peer wireless communication devices to delete the message from memories on the peer wireless communication devices.

2. The method of claim 1, further comprising deleting the message from the second wireless communication device after a predetermined time interval.

3. The method of claim 1, further comprising deleting the message from the second wireless communication device after the message has been sent to the first wireless communication device.

4. The method of claim 1, wherein the second wireless communication device stores up to a predetermined number of additional messages, each of the additional messages being intended for a corresponding additional wireless communication device registered with the WLAN access point.

5. The method of claim 1, wherein the second wireless communication device comprises a first peer wireless communication device and one or more additional peer wireless communication devices, wherein one of the one or more of the peer wireless communication devices is the first peer wireless communication device, and wherein the method further comprises preventing sending of the message from the one or more additional peer wireless communication devices to the first wireless communication device after the message has been sent to the first wireless communication device from the first peer wireless communication device.

6. The method of claim 1, further comprising preventing sending of the message from the WLAN access point to the first wireless communication device when the first wireless communication device is within a communication range of the WLAN access point after the message has been sent to the first wireless communication device from the second wireless communication device.

7. The method of claim 1, wherein when the first wireless communication device is in communication range of the WLAN access point, the method further comprises transmitting a signal from the first wireless communication device to the WLAN access point and in response to receiving the signal, updating a message list in the WLAN access point showing that the message has been delivered to the first wireless communication device.

8. The method of claim 7, further comprising responsive to updating the message list, stopping all attempts to send the message from the WLAN access point to the first wireless communication device.

9. The method of claim 1, further comprising, prior to sending only the message having the unique identifier from the second wireless communication device over the second wireless network to the first wireless communication device, transmitting a signal from the first wireless communication device to the second wireless communication device, the signal instructing the second wireless communication device to initiate sending the message.

10. The method of claim 1, wherein the message is encrypted.

11. The method of claim 1, wherein when the second wireless communication device is in communication range of the WLAN access point after the message has been wirelessly sent to the first wireless communication device from the second wireless communication device, the method further comprises transmitting a signal from the second wireless communication device to the WLAN access point, and in response to receiving the signal, updating a message list in the WLAN access point showing that the message has been delivered to the first wireless communication device.

12. The method of claim 11, further comprising responsive to updating the message list, stopping all attempts to send the message from the WLAN access point to the first wireless communication device.

13. The method of claim 1, wherein the second network is one of a Bluetooth, and an Infrared network.

* * * * *